United States Patent
Cunha et al.

(10) Patent No.: US 12,008,743 B2
(45) Date of Patent: Jun. 11, 2024

(54) HAZARD DETECTION ENSEMBLE ARCHITECTURE SYSTEM AND METHOD

(71) Applicant: Robert Bosch GmbH, Stuttgart (DE)

(72) Inventors: Carlos Cunha, Mountain View, CA (US); Simon Markus Geisler, Bavaria (DE); Ravi Kumar Satzoda, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/881,581

(22) Filed: May 22, 2020

(65) Prior Publication Data

US 2021/0366096 A1 Nov. 25, 2021

(51) Int. Cl.
*G06V 20/58* (2022.01)
*G06N 3/0455* (2023.01)
(Continued)

(52) U.S. Cl.
CPC ............. *G06T 7/0002* (2013.01); *G06N 3/08* (2013.01); *G06N 20/20* (2019.01);
(Continued)

(58) Field of Classification Search
CPC ..... G06T 7/00; G06T 7/0002; G06T 2207/00; G06T 2207/10012; G06T 2207/10024;
(Continued)

(56) References Cited

U.S. PATENT DOCUMENTS

| 11,069,084 B2* | 7/2021 | Chen .................. G06K 9/34 |
| 2003/0041106 A1* | 2/2003 | Tuli ...................... H04L 69/329 |
| | | 709/203 |

(Continued)

FOREIGN PATENT DOCUMENTS

| CN | 109472734 A | * 3/2019 |
| CN | 110310255 A | * 10/2019 |

(Continued)

OTHER PUBLICATIONS

S. McMahon, N. Sünderhauf, B. Upcroft and M. Milford, "Multimodal Trip Hazard Affordance Detection on Construction Sites," in IEEE Robotics and Automation Letters, vol. 3, No. 1, pp. 1-8, Jan. 2018, doi: 10.1109/LRA.2017.2719763. (Year: 2018).*

(Continued)

*Primary Examiner* — Sean M Conner
(74) *Attorney, Agent, or Firm* — Brooks Kushman P.C.

(57) ABSTRACT

A system and method is disclosed that may employ a set of ensemble methods that comprise a plurality of machine learning algorithms or statistical algorithms for hazard detection. The system and method may combine images, stereo and context information using a plurality of deep learning algorithms to accurately detection hazards. The system and method may incorporate a depth channel to the red, green, and blue (RGB) channels of an image to create a four-channel RGBD image. The system and method may also overlay an RGB image with a color-map of the depth channel. The system and method may further concatenate regions of interest (ROI) to the RGB channels of an image. Lastly, the system and method may incorporate an auxiliary semantic segmentation decoder for a multi-task learning event on a drivable space.

9 Claims, 5 Drawing Sheets

(51) Int. Cl.
*G06N 3/08* (2023.01)
*G06N 20/20* (2019.01)
*G06T 7/00* (2017.01)

(52) U.S. Cl.
CPC ............ *G06T 2207/10012* (2013.01); *G06T 2207/10024* (2013.01); *G06T 2207/10028* (2013.01); *G06T 2207/20081* (2013.01); *G06T 2207/20084* (2013.01)

(58) Field of Classification Search
CPC . G06T 2207/10021; G06T 2207/10028; G06T 2207/20081; G06T 2207/20084; G06N 20/00; G06N 20/10; G06N 20/20; G06N 3/08; G06V 10/40; G06V 20/56
USPC ............... 382/100, 103, 106–107, 291, 276
See application file for complete search history.

(56) References Cited

U.S. PATENT DOCUMENTS

| | | | | |
|---|---|---|---|---|
| 2013/0107010 | A1* | 5/2013 | Hoiem | G06K 9/46 348/47 |
| 2014/0307056 | A1* | 10/2014 | Collet Romea | G06T 7/136 348/47 |
| 2015/0022649 | A1* | 1/2015 | Koppal | H04N 5/23212 348/77 |
| 2020/0026302 | A1 | 1/2020 | Wolcott et al. | |
| 2021/0089794 | A1* | 3/2021 | Chen | G06K 9/4671 |

FOREIGN PATENT DOCUMENTS

| | | | |
|---|---|---|---|
| CN | 111126185 A | * | 5/2020 |
| DE | 102016014783 A1 | | 7/2017 |

OTHER PUBLICATIONS

S. Saleh, S. Manoharan, J. Nine and W. Hardt, "Towards Robust Perception Depth Information For Collision Avoidance," 2020 IEEE Congreso Bienal de Argentina (ARGENCON), 2020, pp. 1-4, doi: 10.1109/ARGENCON49523.2020.9505483. (Year: 2020).*
D. Wang, X. Chen, H. Yi and F. Zhao, "Improvement of Non-Maximum Suppression in RGB-D Object Detection," in IEEE Access, vol. 7, pp. 144134-144143, 2019, doi: 10.1109/ACCESS.2019.2945834. (Year: 2019).*
C. Kim et al., "Implementation of Yolo-v2 Image Recognition and Other Testbenches for a CNN Accelerator," 2019 IEEE 9th International Conference on Consumer Electronics (ICCE—Berlin), 2019, pp. 242-247, doi: 10.1109/ICCE-Berlin47944.2019.8966213. (Year: 2019).*
Fu, Keren, et al. "JL-DCF: Joint learning and densely-cooperative fusion framework for RGB-D salient object detection." Proceedings of the IEEE/CVF conference on computer vision and pattern recognition. 2020. (Year: 2020).*
Liu, Zhengyi, et al. "Salient object detection for RGB-D image by single stream recurrent convolution neural network." Neurocomputing 363 (2019): 46-57. (Year: 2019).*
Liu, Nian, and Junwei Han. "Dhsnet: Deep hierarchical saliency network for salient object detection." Proceedings of the IEEE conference on computer vision and pattern recognition. 2016. (Year: 2016).*
Geisler, Simon, Carlos Cunha, and Ravi Kumar Satzoda. "Better, faster small hazard detection: instance-aware techniques, metrics and benchmarking." IEEE transactions on intelligent transportation systems 23.7 (2021): 9062-9077. (Year: 2021).*
Gupta, Krishnam, et al. "Mergenet: A deep net architecture for small obstacle discovery." 2018 IEEE International Conference on Robotics and Automation (ICRA). IEEE, 2018. (Year: 2018).*

* cited by examiner

HAZARD DETECTION ENSEMBLE ARCHITECTURE SYSTEM AND METHOD

TECHNICAL FIELD

The present disclosure relates to an ensemble architecture for detecting hazards within a stereo image.

BACKGROUND

Road debris leads to many reported crashes every year in the United States. A robust advanced detection and warning system and method for road debris or hazards may be desirable whether implemented in an autonomous driving system or a conventional (i.e., human-controlled) driving system.

SUMMARY

A system and method is disclosed for detecting hazards within a stereo image having a red channel, a blue channel, and a green channel. The red channel, the blue channel, and the green channel producing a 3-channel RGB image. The system and method may include an ensemble network having one or more convolutional layers, batch normal layers, YOLO layers, and upsample layers. It is contemplated that the ensemble network may be designed using a YOLOv3 Tiny or Mask R-CNN architecture.

The ensemble network may be operable to determine the one or more hazards within the stereo image by concatenating a depth channel with the red channel, the blue channel, and the green channel, wherein the concatenation produces a 4-channel RGBD image. The ensemble network may also be operable to increase a number of bits within each of the red channel, the blue channel, and the green channel to produce a modified 3-channel RGB image. The modified 3-channel RGB image may then be overlaid with a colormap of a depth channel.

The ensemble network may also determine the one or more hazards within the stereo image by extracting a region of interest from a label map and concatenating the region of interest with the red channel, the blue channel, and the green channel, wherein the concatenation produces a 4-channel image. The ensemble network may also determine the one or more hazards within the stereo image by concatenating an output classification from a semantic segmentation algorithm with the red channel, the blue channel, and the green channel, wherein the concatenation produces a 4-channel image.

The ensemble network may further include a first RGB encoder network and a second depth encoder network, the first RGB encoder network having a plurality of fusion layers, and an output value from a plurality of encoder network layers being added to the plurality of fusion layers. Lastly, an auxiliary semantic segmentation decoder may be included to force the ensemble network to learn one or more features for a drivable space to determine the one or more hazards within the stereo image.

DETAILED DESCRIPTION

Figure 1:
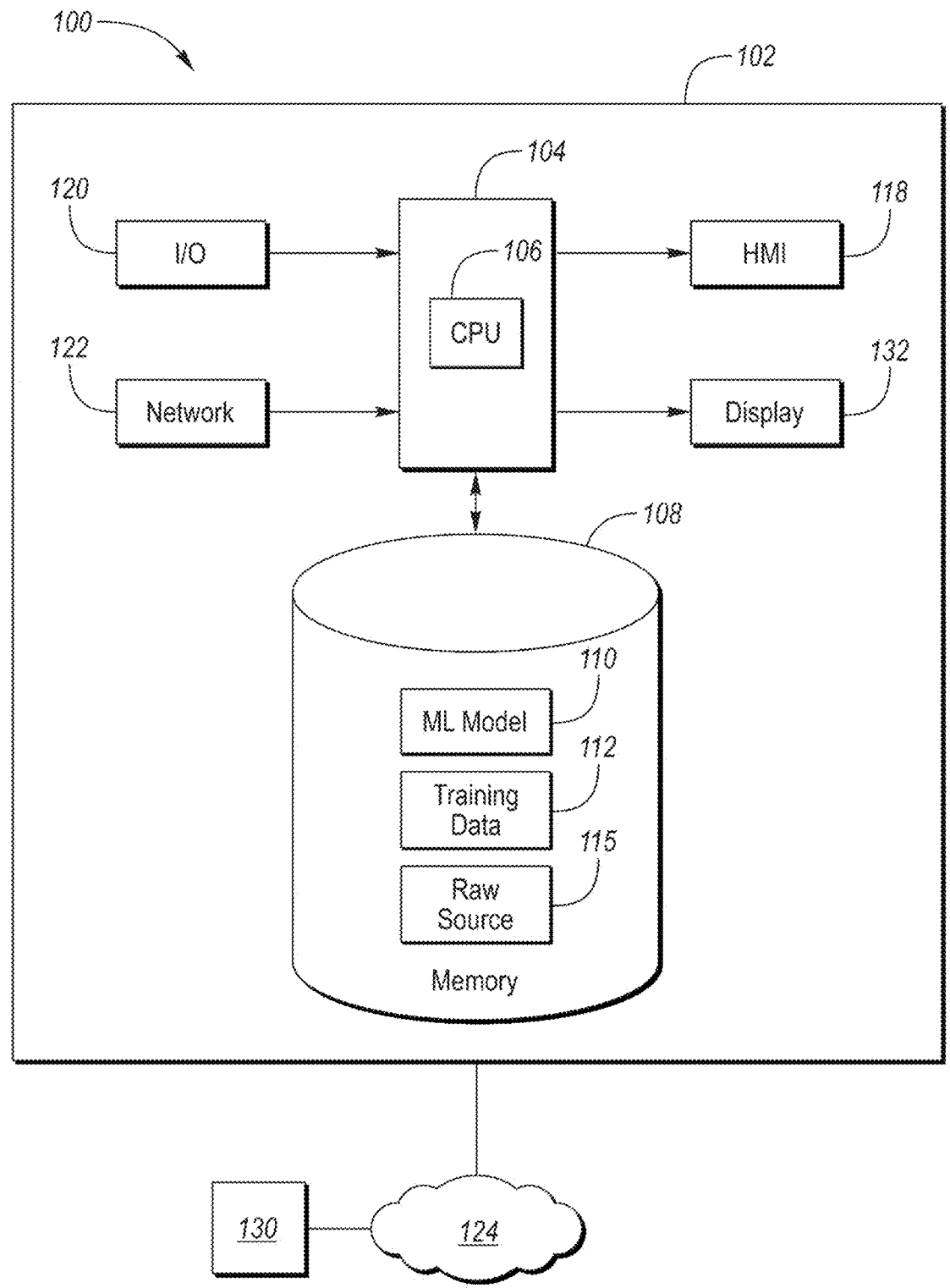
FIG. 1 illustrates an exemplary computing system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Road debris leads to many police-reported crashes every year in the United States. It is therefore desirable for both autonomous driving systems or conventional driving systems to be capable of advanced detection warning, and response to road hazards/debris. While it is contemplated that existing systems may operate to detect objects (e.g., pedestrian detection or traffic light/sign detection) hazard detection systems are not as readily employed even though vehicle controllers are typically not designed to detect them.

To address the problem of hazard detection, one or more computer vision algorithms (e.g., stereo vision and optical flow) may be employed. Or, occlusion edge maps may also be used to assist with detecting small hazard. On a pixel-level metric, one or more deep learning algorithms may also be employed after undergoing a training process using a lost and found dataset.

For instance, a Fast-Direct Planar Hypothesis Testing (FPHT) that combines the lost and found dataset and a stereo vision-based algorithm may be used for hazard detection. It is understood that the lost and found dataset may be a known benchmark for training hazard detection machine learning algorithms. The FPHT algorithm may be based on the statistical analysis of disparity maps from stereo cameras for drivable spaces and obstacles. The FPHT algorithm may operate by performing hypothesis testing if there is an object in a computationally robust and efficient fashion. The deep learning algorithm may also be operable for appearance-based detection of small road hazards. It is contemplated that the predicted FPHT Stixels may then be fused with Stixels extracted from a semantic segmentation network using one or more known machine learning architectures (e.g., GoogLeNet).

Another hazard detection algorithm may employ a semantic segmentation approach (e.g., MergeNet) with potential operating performance as those provided by the FPHT fusion. It is contemplated that the semantic segmentation may employ both RGB images and a conventional derived disparity map. The MergeNet process may also employ two to three semantic segmentation networks. One additional and relatively shallow network may be used to fuse the different semantic maps. Generally, one semantic segmentation network operating on the full resolution RGB image may be combined with another network running on vertical stripes of an image.

An anomaly detection algorithm may also be used to detect hazards by reconstructing the road using compressive networks such as a Restricted Boltzmann Machine (RBM) or autoencoders. It is contemplated that a Generative Adversarial Network (GAN) may also be used to detect unexpected hazards. The semantic segmentation may then be used as an input of the GAN to resynthesize the original map. The generated image may then be compared to the input image to detect discrepancies.

Stereo vision algorithms to calculate depth (i.e. disparity maps) that require less computation time (i.e., faster), but possibly more sensitive to occlusions and sensor noise. It is therefore contemplated that it may be challenging to leverage disparity information in combination with RGB images in deep learning purely as a fourth channel since early fusion approaches may be sensitive to noise. Computing system 102 may be operable to overcome potential challenges with this approach because the depth may be represented in an alternative method or an alternative late fusion architecture and novel depth data augmentation technique may be employed. It is also contemplated that the FuseNet approach may additionally be employed using a middle fusion strategy. Computing system 102 may therefore be operable to employ a middle or late fusion algorithm.

Multi-task learning algorithms are also contemplated for hazard detection where multiple computer vision tasks may be solved with one joint neural network. This approach may employ both object detection and semantic segmentation, but these techniques may not be exclusive to two-dimensional tasks. Because of the shared computations, the combined network may be less expensive than independent networks and multi-task learning algorithms may also provide improved generalization.

While one or more of these algorithms may be employed for hazard detection, there still exists potential challenges. For instance, one challenge that may exist relates to "class imbalance" where—unlike tasks of traffic sign, vehicle or pedestrian detection—the problem of hazard detection may be more difficult because road hazards may be less common. While less common, road hazards are still responsible for a significant number of accidents each year (e.g., around 50,000 accidents in the United States alone). But being less common, naturalistic driving datasets with hazards usable for training machine learning algorithms are generally less available and the training procedure may be more costly than for balanced detection tasks.

Another challenge that may exist relates to the "context" where an object may be considered a hazard dependent on whether it is in the potential driving path of a vehicle. With respect to machine learning algorithms the challenge not only involves detecting objects, but also developing an algorithm that can determine whether those objects may be problematic given their current location. For instance, a given object (e.g., pothole) of reasonable size may be considered a hazard if and only if the object is located within the potential driving path of the vehicle.

A further challenge that may exist relates to the "diversity" of an object. Since there may exist an endless number of objects that may be classified as a hazard, machine learning algorithms dealing with hazard detection should be able to forecast things that may not be available in the training set. For instance, debris from car collisions, dropped cargo, cracks on the road, and toys may be diverse potential hazards that do not have any consistency regarding shape, color, or composition. In addition, driving scenes featuring hazards can be extremely different—in both reality and in publicly available datasets. The diversity (i.e., variability) of hazards makes it challenging to acquire sufficient data and may impact the efficiency of real-time operation of the machine learning algorithms in detecting hazards with high recall and precision.

A final challenge that may exist relates to the "metrics" of an object. For instance, conventional object detection or semantic segmentation metrics may not completely capture the quality of the algorithm for hazard detection. Recent work in the metrics space also does not appear to correlate regarding the instance-level metrics. There therefore exists a need to propose a consistent set of metrics with regards to hazard detection.

With regards to these challenges, detecting road surface hazards using a pixel wise prediction algorithm may provide accurate results while semantic segmentation algorithms may be computationally expensive and have difficulties tracking objects over time. Also, predicting a pixel-accurate outline may not be required for hazard detection. Instead, hazard detection may be employed as a subset of object detection or instance segmentation. It is therefore contemplated that an object detection or instance segmentation architectures may be used at the start of detecting hazards.

By employing an object/instance detection algorithm for hazard detection, potential recall-precision tradeoffs and the tracking objects over time may be reduced. A confidence threshold may also be employed and may be tunable allowing greater flexibility across applications and improved performance in meeting the needs of a given application.

While it may also be possible to achieve similar performance from a semantic segmentation algorithm, such a solution may be more complex to implement and greater adjustment of the loss may be required during the training process. Also, to distinguish between different instances there exists a need to track the objects having different trajectories. It is contemplated that Kalman filter algorithms may be employed to make these distinctions.

It is also contemplated that for given applications (e.g., autonomous vehicles) hazards may need to be reliably detected at increased distances because the hazards will be approaching at high velocities. Also, machine learning algorithms may need to avoid false positives when employed together with, or as part of, an autonomous vehicle's operational control strategy.

It is also contemplated that the machine learning algorithm may be required to operate on a diverse set of hazards which may only be hazards if they appear in the "right" context—as explained above with regards to the challenges associated with hazard detection. Also, despite the potential for high class imbalance the machine-learning algorithm may be required to be trained and operable to detect "potential" hazards (e.g., "there is something potentially hazardous laying on the road").

It is therefore contemplated that one or more machine learning algorithms and statistical algorithms may be employed to provide detection of unexpected, undefined, hazards in roadways (e.g., highways, alleys, parking lots) that may be of various shapes (e.g. cars, trucks, and pedestrians) and sizes (e.g., objects having a size between 5 centimeter and 1 meter). The machine learning and statistical algorithms may also employ multi-task learning for improved generalization in detecting hazards. Due to the potential limitation on computational resources (e.g., embedded applications), the machine learning and statistical algorithms may also be optimized to provide the required functionality necessary for given applications. It is further contemplated that the machine learning and statistical algorithms may be designed at a reduced computational amount.

FIG. 1 illustrates an exemplary system 100 that may be used to employ one or more machine learning algorithms and statistical algorithms for detecting unexpected, undefined, hazards. The system 100 may include at least one computing devices 102. The computing system 102 may include at least one processor 104 that is operatively connected to a memory unit 108. The processor 104 may be one or more integrated circuits that implement the functionality of a processing unit (PU) 106. The PU 106 may be a commercially available central processing unit (CPU) that implements an instruction such as one of the x86, ARM, Power, or MIPS instruction set families. Or, the processing unit 106 may be a commercially available graphic processing unit (GPU) that is composed of hundreds of cores operable to handle numerous parallel tasks at the same time (i.e., parallel computing).

During operation, the PU 106 may execute stored program instructions that are retrieved from the memory unit 108. The stored program instructions may include software that controls operation of the PU 106 to perform the operation described herein. In some examples, the processor 104 may be a system on a chip (SoC) that integrates functionality of the PU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, training dataset 112 for the machine-learning model 110, and/or raw source data 115.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122.

The system 100 may be implemented using one or multiple computing systems. While the example depicts a single computing system 102 that implements the described features, it is intended that various features and functions may be separated and implemented by multiple computing units in communication with one another. The architecture selected may depend on a variety of factors.

The system 100 may implement one or more machine-learning algorithms 110 that are configured to analyze the raw source data 115 (or dataset). The raw source data 115 may include raw or unprocessed sensor data that may be representative of an input dataset for a machine-learning system. The raw source data 115 may include video, video segments, images, and raw or partially processed sensor data (e.g., data from digital camera or LiDAR sensor). In some examples, the machine-learning algorithm 110 may be a neural network algorithm (e.g., Transformer, CNN, RNN, or DNN) that may be designed to perform a predetermined function.

Figure 2:
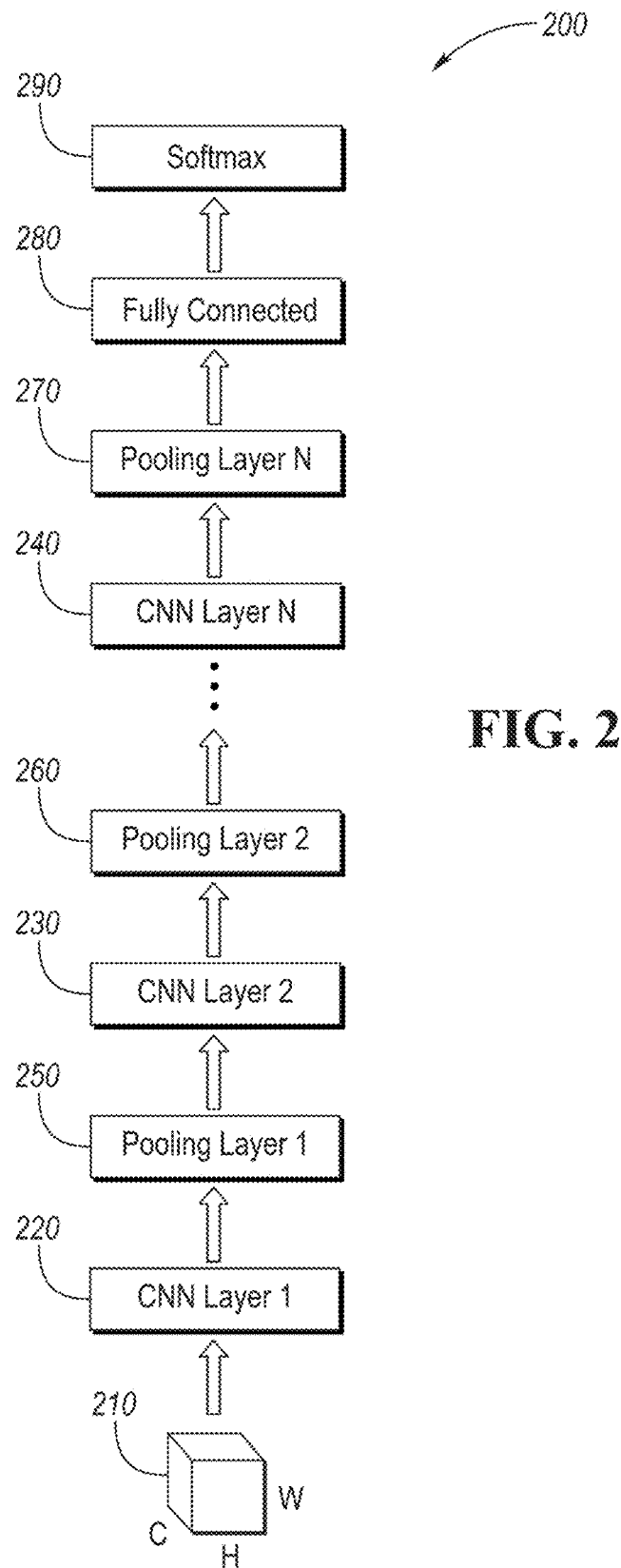
FIG. 2 illustrates an exemplary convolutional neural network.

For instance, FIG. 2 illustrates a non-limiting example of a CNN 200 that includes: an input dataset 210; one or more convolutional layers 220-240; one or more pooling layers 250-270; a fully connected layer 280; and a softmax layer 290.

The input dataset 210 may include raw images, voice data, or text data. Input dataset 210 may also include measurements received from one or more sensors. Alternatively, input dataset 210 may be lightly processed prior to being provided to CNN 200. Convolutional layers 220-240 may also be operable to extract features from the input dataset 210. It is generally understood that convolutional layers 220-240 may be operable to apply filtering operations (e.g., kernels) before passing on the result to another layer of the CNN 200. For instance, for a given dataset (e.g., color image), the convolution layers may execute filtering routines to perform operations such as image identification, edge detection of an image, and image sharpening.

It is also contemplated that the CNN may include one or more pooling layers 250-270 that receive the convoluted data from the respective convolution layers 220-240. Pooling layers 250-270 may include one or more pooling layer units that apply a pooling function to one or more convolution layer outputs computed at different bands using a pooling function. For instance, pooling layer 250 may apply a pooling function to the kernel output received from convolutional layer 220. The pooling function implemented by pooling layers 250-270 may be an average or a maximum function or any other function that aggregates multiple values into a single value.

A fully connected layer 280 may also be operable to learn non-linear combinations for the high-level features in the output data received from the convolutional layers 220-240 and pooling layers 250-270. Lastly, CNN 200 may include a softmax layer 290 that combines the outputs of the fully connected layer 280 using softmax functions. It is contemplated that the neural network algorithm shown by FIG. 2 may be configured for operation within automotive applications to identify objects (e.g., pedestrians) from images provided from a digital camera and/or depth map from a LiDAR sensor.

The machine-learning algorithm 200 may be operable to combine image, stereo, and context information to provide improved detection accuracy and computational speed. For instance, the machine learning algorithm 200 may employ object detection architectures that complement RGB with additional information. The machine-learning algorithm may also be designed using known or custom architectures (e.g., Mask R-CNN, DeepLabV3+, YOLOv3 Tiny) that may provide a deployable real-time application that is cost-effective. A first set of strategies may incorporate disparities and a second set of strategies may be designed to achieve a better understanding of the drivable space.

The machine learning algorithm 200 may also undergo a training process that employs one or more datasets (e.g., the Lost and Found dataset, KITTI, MS Coco, ImageNet, Cityscape). It is understood that the Lost and Found dataset may be a stereo vision dataset that contains one or more pre-calculated disparity maps obtained through semi-global block matching. It is also contemplated that the Lost and Found dataset may provide label maps for segmentation, including the drivable space and the hazards. The format of the Lost and Found dataset may also generally follow the structure of the Cityscapes dataset.

The machine learning algorithm 200 may also be operable to detect hazards by concatenating the depth channel of one or more images received as data 115. It is contemplated that concatenation may be employed because it may be considered a naïve method for incorporating depth.

Figure 3A:
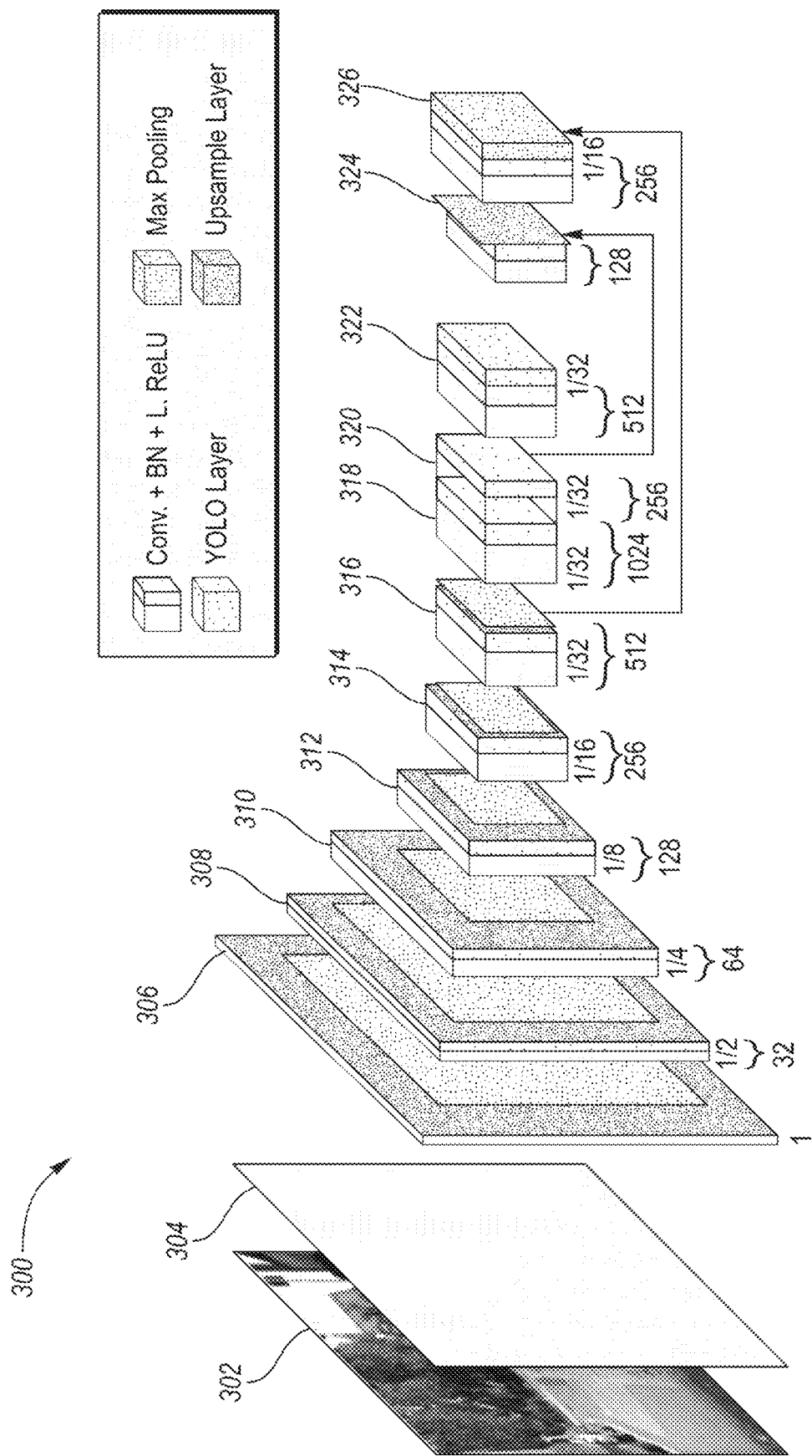
FIGS. 3A and 3B illustrates exemplary ensemble machine learning architectures for detecting hazards.

For instance, FIG. 3A illustrates an embodiment of the machine learning architecture 300 that may be employed by computing system 102. It is contemplated that the machine learning architecture 300 may be operably designed like the YOLOv3 Tiny architecture. As illustrated, the machine learning architecture 300 may receive an RGB image 302 and depth image 304 as data 115. The machine learning architecture 300 may then include one or more layers 306-326 that operate to concatenate the depth channel to the red, green, and blue channels of the image, thereby producing a 4-channel, RGBD image.

It is contemplated that layers 306-316 may include one or more convolutional layers, batch normal layers, a leaky ReLU activation functions, and max pooling layers. Layers 318-320 may likewise include one or more convolutional layers, batch normal layers, and leaky ReLU activation functions. But, layers 318-320 may not include one or more max pooling layers. Layers 322 and 326 may include one or more convolutional layers, batch normal layers, leaky ReLU activation functions, and YOLO (you only look once) layers. It is contemplated that the YOLO layer may include a convolutional layer, the YOLO output processing, and a cost function. Lastly, layer 324 may include one or more convolutional layers, batch normal layers, leaky ReLU activation functions, and one or more upsample layers. It is also contemplated that one or more skip architectures may be employed. For instance, the output of layer 314 may be provided as an input to layer 326. Likewise, the output of layer 320 may be provided as an input to layer 324. FIG. 3A also illustrates the number of concatenations (e.g., 1, 1/2/14, etc.) and the number of summations after the activations (e.g., 32, 64, 128, etc.).

It is also contemplated that the machine learning 200 may incorporate depth in alternative methods. For example, the RGB image 302 may be overlaid with a colormap of the depth channel by increasing the number of bits in each of the RGB channels. Or the machine learning architecture 300 may be operable to detect hazards by concatenating Region of Interest (RoI) as the $4^{th}$ channel. For instance, machine learning algorithm 200 may extract the RoI from a label map. It is also contemplated that during run-time processing the machine learning algorithm may be operable to concatenate the output of a semantic segmentation algorithm. For instance, a semantic segmentation algorithm may already be employed within a vehicle controller. Machine learning architecture 300 may receive the output of the semantic segmentation algorithm already employed by the vehicle controller to provide hazard detection at a reduced cost. However, it is also contemplated that bit-level concatenation yielded may yield similar results to channel concatenation.

Figure 3B:
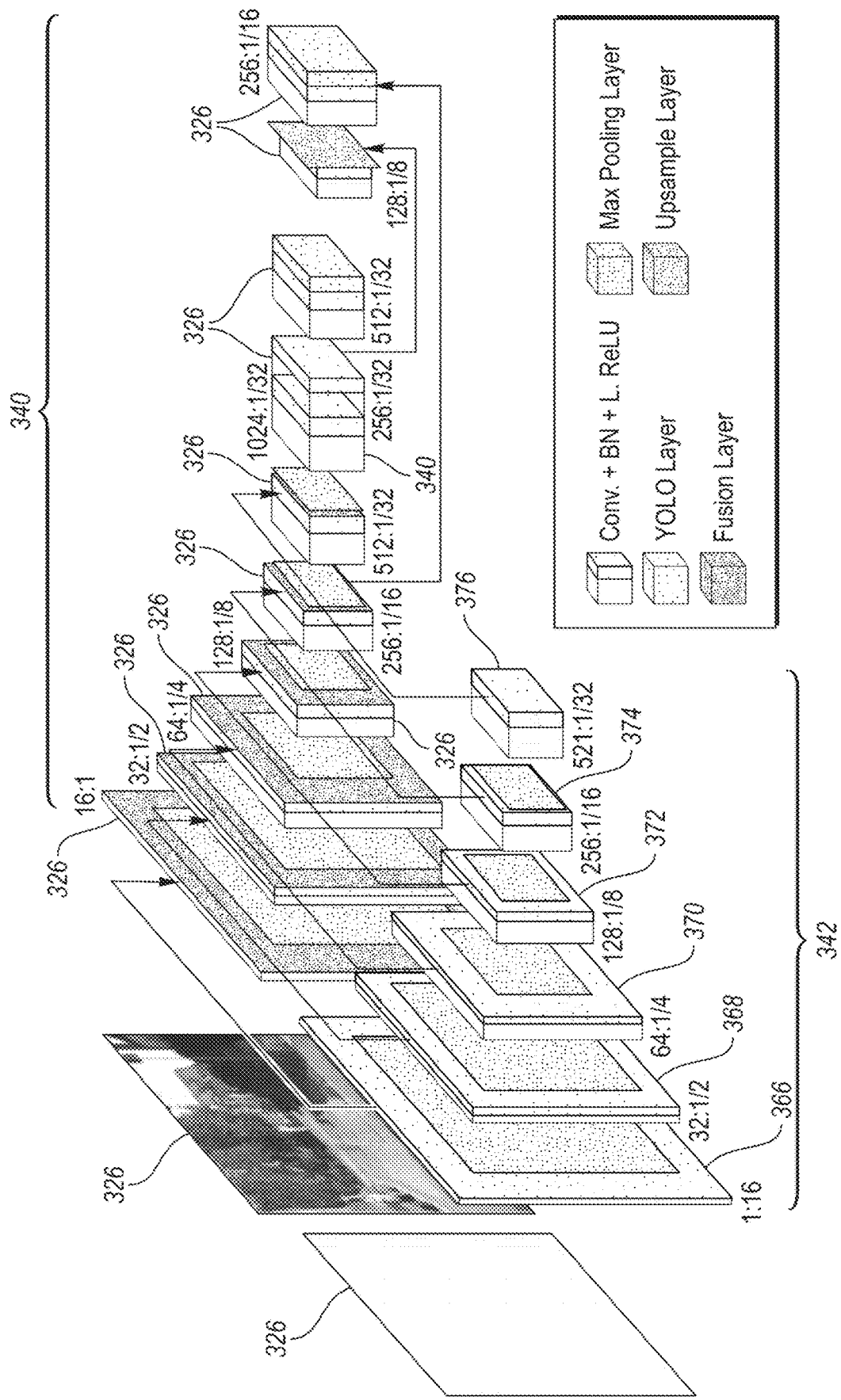

Alternatively, as shown by FIG. 3B, a depth middle fusion architecture may be employed to perform hazard detection. For instance, t a first encoder 340 (i.e., RGB encoder) and a second encoder 342. It is contemplated that the second encoder 342 may be additionally added onto the YOLOv3 Tiny architecture (i.e., the first encoder 340) to provide one or more single-channel disparities as inputs to the first encoder 340.

As shown, the first encoder 340 may include layers 344-364. It is contemplated that layers 344-354 may include one or more convolutional layers, batch normal layers, leaky ReLU activation functions, max pooling layers, and fusion layers. Layers 356-358 may include one or more convolutional layers, batch normal layers, and leaky ReLU activation functions. But, layers 356-358 may not include one or more max pooling layers nor fusion layers. Layers 360 and 364 may include one or more convolutional layers, batch normal layers, leaky ReLU activation functions, and YOLO layers. Lastly, layer 362 may include one or more convolutional layers, batch normal layers, ReLU activation functions, and one or more upsample layers. It is also contemplated that one or more skip architectures may be employed. For instance, the output of layer 352 may be provided as an input to layer 364. Likewise, the output of layer 358 may be provided as an input to layer 362. FIG. 3B also illustrates the number of concatenations (e.g., 1, 1/2/14, etc.) and the number of summations after the activations (e.g., 32, 64, 128, etc.).

The second encoder 342 may include layers 366-376. It is contemplated that layers 366-374 may include one or more convolutional layers, batch normal layers, leaky ReLU activation functions, and max pooling layers. Layer 376 may include one or more convolutional layers, batch normal layers, and leaky ReLU activation functions. But, layer 376 may not include one or more max pooling layers nor fusion layers. It is also contemplated that the output of layer 366-376 may be provided as an input to layers 344-354, respectively. Stated differently, after each activation layer for the second encoder 342, the values of the second encoder 342 (i.e., depth encoder) are added to the values of the first encoder 340 (i.e., RGB encoder). It is also contemplated that the second encoder 342 may be initialized randomly. But it is also contemplated that the pretrained weights (i.e., established during a training process) may be used to initialize all the other layers 344-364.

It is contemplated that the YOLOv3 architecture may not be highly optimized for applications with a high-class imbalance. It is also contemplated that the object versus no object imbalance may increase quadratically with the width/height of the input image (i.e., image 302). For instance, when applying nine anchors on input images with 2048×1024 pixels (92160 potential predictions) and not 416×416 pixels (7605 possible predictions) the YOLOv3 network systematically may predict a lower confidence score in comparison to its probability for a correct prediction. To compensate, the machine learning algorithm 200 illustrated by FIG. 3B (i.e., the depth middle fusion architecture) may employ the loss function shown by Equation (1) below:

$$L_{YoloDepth} = \partial_{xy} * L_{xy} + \partial_{GIoU} * L_{GIoU} + \partial_{obj} * L_{obj} \quad (1)$$

Where $L_{xy}$ may be the original YOLOv3 bounding box center loss and $L_{GIoU}$ may be the Generalized Intersection over Union (GIoU) loss. It is contemplated that the term $L_{xy}$ may not be required since the center of the bounding box prediction is also covered by the $L_{GIoU}$ term. Regardless, the term $L_{xy}$ may be included to reduce the number of epochs until the training process converges. The term $L_{obj}$ may also denote the binary cross-entropy loss, weighted by the inverse class frequency to the power of $k_2|0,1|$. The term $k_2|0,1|$ may be included because the training may become unstable when the inverse class frequency (k=1) is employed. To help adjust, the term $\partial(c) = 1/N_c^k$ may be employed, where Nc may be the number of object/no object labels of the mini-batch. It is also contemplated, that for Equation (1) the loss terms may be balanced by the respective "$\partial$" hyperparameter. It is also contemplated that the depth middle fusion architecture illustrated by FIG. 3B may be employed using a Focal Loss algorithm. However, for certain classification applications (e.g., binary classification) usage of the Focal Loss algorithm may not provide improved performance in comparison to the $L_{obj}$ term as applied by Equation (1).

Lastly, the machine learning algorithm 200 may employ a multi-task learning algorithm on a drivable space to perform hazard detection. An auxiliary semantic segmentation decoder may be operable to force the machine learning network 200 to learn features for the drivable space. It is contemplated that a SegNet decoder (e.g., MergeNet) may be employed by the multi-task learning algorithm. But it is also contemplated that the auxiliary semantic segmentation decoder may not be required for the deployment of the machine learning algorithm 200 used for object detection. Also, when employing a multi-task learning algorithm, the term $L_{sem}$ may be included to the overall cost of Equation (1). Since features of the road may be considered more relevant, the multi-task algorithm may use unweighted cross-entropy for the auxiliary semantic segmentation output. This approach as middle fusion with auxiliary semantic segmentation It is therefore contemplated that for improved hazard detection a set of ensemble methods may be employed (i.e., multiple learning algorithms that may obtain better predictive performance than may be be obtained from any one constituent learning algorithms alone). Various hazard detectors combined into a single prediction have been disclosed. The ensemble of instance segmentation and object detection algorithms may be used to overcome many of the potential challenges of hazard detection. Also, the ensemble of a computationally expensive machine learning algorithm (e.g. Mask R-CNN) with a less computationally expensive machine learning algorithm (e.g. YOLOv3 Tiny) may be used for hazard detection. Ensembles that combine similar machine learning algorithms with different "backbones" (e.g., different encoder architectures and pre-training datasets) may also be used for hazard detection. Lastly, ensembles that fuse similar machine learning algorithms that are trained to classify a road (i.e., good understanding of what a road is) may also be used for hazard detection.

Figure 4:
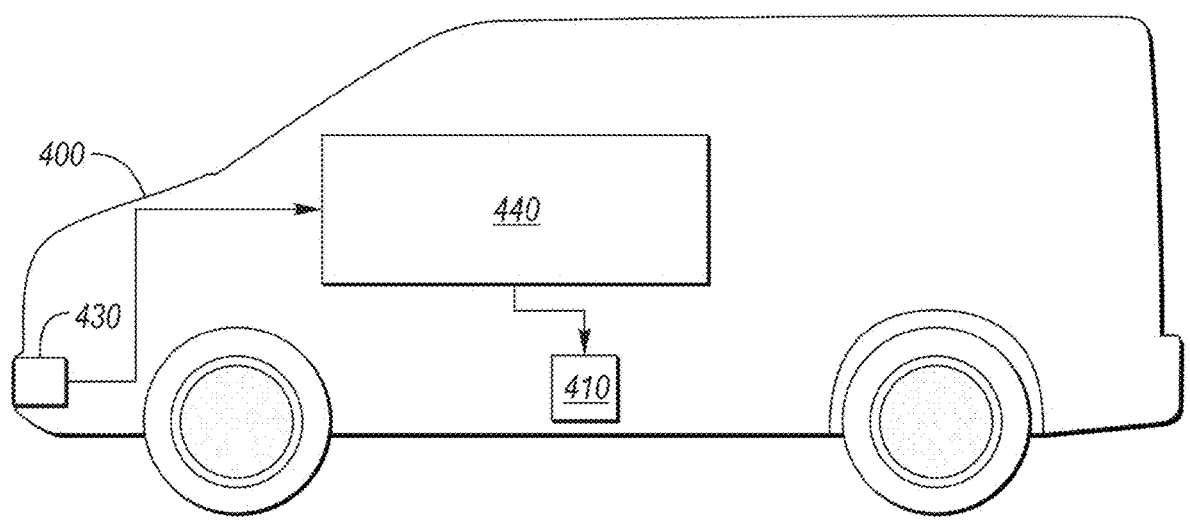
FIG. 4 illustrates a computing system controlling an at least partially autonomous robot.

FIG. 4 illustrates an exemplary computing system 440 that may be used to detect hazards and control a partially autonomous robot, e.g. a partially autonomous vehicle 400. The computing system 440 may be like the system 100 described in FIG. 1. Sensor 430 may comprise one or more video/camera sensors and/or one or more radar sensors and/or one or more ultrasonic sensors and/or one or more LiDAR sensors and/or one or more position sensors (like e.g. GPS). Some or all these sensors are preferable but not necessarily integrated in vehicle 400.

Alternatively, sensor 430 may comprise an information system for determining a state of the actuator system. The sensor 430 may collect sensor data or other information to be used by the computing system 440. Using input signal x, the system may for example detect hazards in the vicinity of the at least partially autonomous robot. Output signal y may comprise an information which characterizes where objects are in the vicinity of the at least partially autonomous robot. Control command A may then be determined in accordance with this information, for example to avoid collisions with said detected objects.

Actuator 410, which may be integrated in vehicle 400, may be given by a brake, a propulsion system, an engine, a drivetrain, or a steering of vehicle 400. Actuator control commands may be determined such that actuator (or actuators) 410 is/are controlled such that vehicle 400 avoids collisions with said detected objects. Detected hazards may also be classified according to what the machine learning algorithm 200 deems them most likely to be, e.g., pedestrians or trees, and actuator control commands A may be determined depending on the classification.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method comprising:
receiving a stereo image having a red channel, a blue channel, and a green channel, wherein the red channel, the blue channel, and the green channel produce a 3-channel RGB image;
receiving a depth image;
concatenating the depth image to the red, green, and blue channels of the 3-channel RGB image to produce a 4-channel RGBD image, and providing the 4-channel RGBD image as a single input into a same layer of a neural network, wherein the neural network includes:
a first plurality of layers, wherein each layer in the first plurality of layers includes:
a convolutional layer;
a batch normal layer;
a leaky ReLU activation function; and
a max pooling layer;
a second plurality of layers, wherein each layer in the second plurality of layers includes:
a convolutional layer;
a batch normal layer; and
a leaky ReLU activation function, and wherein the second plurality of layers does not include a max pooling layer;
a third plurality of layers, wherein each layer in the third plurality of layers includes:
a convolutional layer;
a batch normal layer;
a leaky ReLU activation function; and
a you-only-look-once ("YOLO") layer; and
one or more skip architectures;
determining one or more hazards within the stereo image using the neural network;
concatenating an output of the neural network with an output of an auxiliary semantic segmentation decoder to force the neural network to learn one or more features for a drivable space to determine the one or more hazards within the stereo image; and
driving a vehicle through the drivable space while avoiding the one or more hazards.

2. The method of claim 1, wherein the one or more skip architectures include an output from a layer in the first plurality of layers that provides input to a layer including an upsample layer.

3. The method of claim 1, wherein the one or more skip architectures include an output from a layer in the second plurality of layers that provides input to the layer including an upsample layer.

4. One or more non-transitory computer-readable media having computer-executable instructions stored thereon that when executed cause the following operations to be performed:
receiving a stereo image having a red channel, a blue channel, and a green channel, wherein the red channel, the blue channel, and the green channel produce a 3-channel RGB image;
receiving a depth image;
concatenating the depth image to the red, green, and blue channels of the 3-channel RGB image to produce a 4-channel RGBD image, and providing the 4-channel RGBD image as a single input into a same layer of a neural network, wherein the neural network includes:
a first plurality of layers, wherein each layer in the first plurality of layers includes:
a convolutional layer;
a batch normal layer;
a leaky ReLU activation function; and
a max pooling layer;
a second plurality of layers, wherein each layer in the second plurality of layers includes:
a convolutional layer;
a batch normal layer; and
a leaky ReLU activation function, and wherein the second plurality of layers does not include a max pooling layer;
a third plurality of layers, wherein each layer in the third plurality of layers includes:
a convolutional layer;
a batch normal layer;
a leaky ReLU activation function; and
a you-only-look-once ("YOLO") layer; and
one or more skip architectures;
determining one or more hazards within the stereo image using the neural network;
concatenating an output of the neural network with an output of an auxiliary semantic segmentation decoder to force the neural network to learn one or more features for a drivable space to determine the one or more hazards within the stereo image; and
driving a vehicle through the drivable space while avoiding the one or more hazards.

5. The media of claim 4, wherein the one or more skip architectures include an output from a layer in the first plurality of layers that provides input to a layer including an upsample layer.

6. The media of claim 4, wherein the one or more skip architectures include an output from a layer in the second plurality of layers that provides input to the layer including an upsample layer.

7. A system comprising:
one or more processors; and
one or more non-transitory computer-readable media having computer-executable instructions stored thereon that when executed cause the system to perform the following operations:
receiving a stereo image having a red channel, a blue channel, and a green channel, wherein the red channel, the blue channel, and the green channel produce a 3-channel RGB image;
receiving a depth image;
concatenating the depth image to the red, green, and blue channels of the 3-channel RGB image to produce a 4-channel RGBD image, and providing the 4-channel RGBD image as a single input into a same layer of a neural network, wherein the neural network includes:
a first plurality of layers, wherein each layer in the first plurality of layers includes:
a convolutional layer;

a batch normal layer;
a leaky ReLU activation function; and
a max pooling layer;
a second plurality of layers, wherein each layer in the second plurality of layers includes:
a convolutional layer;
a batch normal layer; and
a leaky ReLU activation function, and wherein the second plurality of layers does not include a max pooling layer;
a third plurality of layers, wherein each layer in the third plurality of layers includes:
a convolutional layer;
a batch normal layer;
a leaky ReLU activation function; and
a you-only-look-once ("YOLO") layer; and
one or more skip architectures;

determining one or more hazards within the stereo image using the neural network;
concatenating an output of the neural network with an output of an auxiliary semantic segmentation decoder to force the neural network to learn one or more features for a drivable space to determine the one or more hazards within the stereo image; and
driving a vehicle through the drivable space while avoiding the one or more hazards.

8. The system of claim 7, wherein the one or more skip architectures include an output from a layer in the first plurality of layers that provides input to a layer including an upsample layer.

9. The system of claim 7, wherein the one or more skip architectures include an output from a layer in the second plurality of layers that provides input to the layer including an upsample layer.

* * * * *